United States Patent Office 2,824,073
Patented Feb. 18, 1958

2,824,073

METHOD OF PRODUCING TITANIUM-PHOSPHORIC ACID CATALYST

Paul N. Rylander, Jr., Chicago, Ill., and Wilford J. Zimmerschied, Crown Point, Ind., assignors to Standard Oil Company, Chicago, Ill., a corporation of Indiana No Drawing. Application September 9, 1953
Serial No. 379,290

6 Claims. (Cl. 252—435)

This invention relates to a novel process for the preparation of acidic solid catalysts and the novel catalysts thus produced. More specifically, this invention relates to the so-called "Tifo" catalysts and to a novel and improved process for their manufacture.

The Tifo catalysts are solid, acidic, complex catalysts containing titanium, phosphorus, oxygen and hydrogen in chemical combination and have been produced by a variety of techniques. The Tifo catalysts are light gray, friable solids which may be employed as pellets or powders and have shown high activities in various hydrocarbon conversions, such as olefin polymerization, the alkylation of aromatic hydrocarbons by olefins, isomerization of alkyl aromatics such as xylenes, etc.

Tifo catalysts are insensitive to superheated steam and oxygen, resistant to swelling by solvents, non-corrosive, mechanically and chemically stable, long-lived, and can be readily regenerated. The Tifo catalysts show little tendency to produce coke from hydrocarbon charging stocks, to swell or plug, or to release phosphoric acid when employed in reactor beds.

Tifo catalysts have heretofore been prepared by the reaction of a titanium halide, particularly $TiCl_4$, with orthophosphoric acid in molar ratios sufficient to furnish a halogen:hydrogen ratio between about 0.4 and about 1 at a temperature above about 175° C. for a period of time sufficient to evolve the halogen content of the reaction mixture as hydrogen halide in a substantial proportion of at least about 90%, and preferably at least about 96%, as described in Application for United States Letters Patent, Serial No. 323,517 of Harold Shalit and Arthur P. Lien, filed December 1, 1952, now Patent No. 2,772,244. The previously known method is effective for the production of useful catalysts, but suffers from the disadvantages of the high cost of $TiCl_4$ and the fact that hydrogen chloride is evolved from the reaction mixture, necessitating the employment of HCl-resistant materials in the catalyst preparation equipment. As is well known, HCl-resistant equipment is expensive and special equipment design, which limits its flexibility, may be required.

It is an object of our invention to provide an improved method for the preparation of Tifo catalysts. Another object of our invention is to provide a process for the manufacture of extremely hard, mechanically durable, and analytically active Tifo catalysts. An additional object is to provide mechanically stable Tifo catalysts exhibiting high catalytic activity in hydrocarbon conversions such as the polymerization of normally gaseous olefins and in olefin alkylation reactions. These and other objects of our invention will become apparent from the ensuing description thereof.

In accordance with our invention, a Tifo catalyst is manufactured by mixing titanium dioxide, for example in the form of rutile, anastase or brookite, with triphosphoric acid or a mixture of phosphoric acids containing a substantial proportion (between about 10 and about 95 weight percent) of triphosphoric acid, and heating the doughy mixture to a temperature at which a vigorous, rapid, exothermic reaction occurs with the liberation and escape of water from the reaction mixture. The weight ratio of titanium dioxide to triphosphoric acid can be varied between about 0.1 and about 2, preferably between about 0.25 and about 1.3. The doughy initial mixture of titanium dioxide and triphosphoric acid can be shaped, as by extrusion or molding, before heating to the temperature at which the exothermic reaction occurs. The rapid exothermic reaction occurs at a temperature of about 240° C. and reaction can be effected at about 240° C. to about 330° C., usually about 250° C. In order to prepare a solid catalytic material of increased mechanical stability, the heating of the reaction mixture may be continued to higher temperatures up to about 600° C., more often to about 380° C. to about 400° C. The heating time can be varied from about 0.5 to about 4 hours, preferably about 2 hours.

X-ray analysis of the Tifo catalysts produced by the process of the present invention indicates that they are substantially identical with catalysts produced by the interaction of $TiCl_4$ with orthophosphoric acid. A typical Tifo catalyst prepared from $TiO_2$ and commercial polyphosphoric acid (47.8 weight percent $H_5P_3O_{10}$) in 2:1 weight ratio was found to contain 21.3 weight percent of titanium and 25.6 weight percent of phosphorus.

The Tifo catalysts prepared in accordance with our invention change the color of p-dimethylaminoazobenzene from yellow to red and the color of benzeneazodiphenylamine from yellow to violet, employing the method of C. Walling, J. Am. Chem. Soc. 72, 1164 (1950). The color change of the first indicator shows that the Tifo catalyst surface has a $pK_a$ less than 3.29; the color change of the second indicator shows that the surface of the Tifo catalyst has a $pK_a$ of less than 1.52. It will be apparent, therefore, that the Tifo catalysts are highly acidic.

Surprisingly, we have found that titanium dioxide does not react with meta-, ortho- or pyro-phosphoric acids to produce catalysts, i. e. they are substantially inactive in catalyzing the polymerization of propylene under the standardized conditions employed in our experiments. Thus, a hard, solid material was prepared by heating a mixture of 20 g. of $TiO_2$ and 40 g. of an acid mixture containing 49% $H_4P_2O_7$, 45% $H_3PO_4$ and about 6% $HPO_3$, to 380° C. for 4 hours. This material was inactive in the attempted polymerization of propylene with about 8 weight percent of the solid material at about 200° C. for 2 hours. Also, a material prepared by heating $TiO_2$ and $P_2O_5$ in the molar ratio of 3:2, which should yield $Ti_3(PO_4)_4$, proved inactive for propylene polymerization at about 190° C.

As an example of our improved preparation of the Tifo catalyst, we mixed 79.9 grams of titanium dioxide and 80 grams of commercial polyphosphoric acid having the following composition:

| | Percent |
|---|---|
| Meta-phosphoric acid ($HPO_3$) | 3.6 |
| Triphosphoric acid ($H_5P_3O_{10}$) | 47.8 |
| Pyrophosphoric acid ($H_4P_2O_7$) | 28.6 |
| Orthophosphoric acid ($H_3PO_4$) | 20.0 | at room temperature and heated the mixture without stirring to 250° C. in an open reaction vessel under a hood. At 250° C. a vigorous exothermic reaction was observed, as indicated by a sudden rise in the temperature of the mixture and the evolution of water. The exothermic reaction was soon completed, following which heating of the reaction mixture was continued to 380° C. The total elapsed time was 4 hours. The molar ratio of titanium dioxide to gram atom of phosphorus in the reaction mixture was about 1.1. The reaction yielded a solid material which proved to be an active catalyst for the polymerization of propylene, as shown by the following data. Propylene (43 grams) was heated with 5 grams of the catalyst prepared in the above reaction in a 250 cc. stainless steel autoclave provided with a reciprocating stirrer to 190° C. for 3.5 hours. The polymerization produced a mixture of liquid polymers in the yield of 53.5 weight percent, based on the propylene charged.

One part by weight of $TiO_2$ and two parts by weight of an acid mixture having the following composition were mixed:

| | Weight percent |
|---|---|
| $H_3PO_4$ | 32.3 |
| $H_4P_2O_7$ | 38.9 |
| $H_5P_3O_{10}$ | 27.0 |
| $HPO_3$ | 1.8 |

The mixture was heated to 340° C. for 3 hours. A hard, dry catalyst was produced. A magnetically-stirred autoclave of 250 ml. capacity was charged with 5 grams of this catalyst and 61 grams of propylene and heated with stirring at 210° C. for 2.5 hours to yield 18.5 g. of liquid propylene polymer, corresponding to 30 weight percent conversion of the propylene charged.

The relative inactivity of solid materials produced by the reaction of titanium dioxide with other phosphoric acids, as compared with polyphosphoric acid, is shown in the following table:

Table 1

| Catalyst from— | $TiO_2$/acid (by wt.) | Temp. of Catalyst Preparation, ° C. | Percent Propylene Polymerized at 190° C.[1] |
|---|---|---|---|
| metaphosphoric acid and $TiO_2$ | 1 | 380 | 0 |
| orthophosphoric acid and $TiO_2$ | 0.5 | 290 | 6.6 |
| orthophosphoric acid and $TiO_2$ | 0.5 | 400 | about 5 |
| polyphosphoric acid and $TiO_2$ | 0.5 | 380 | 53.5 |
| polyphosphoric acid and $TiO_2$ | 0.5 | 350 | 73 |

[1] 10 weight percent catalyst, based on propylene charged and 4–5 hours' reaction time.

The slight polymerization activity of the solids prepared from $TiO_2$ and orthophosphoric acid is ascribable to the fact that the acid was somewhat aged and consequently contained a small proportion of triphosphoric acid.

We have found that the activity of the Tifo catalyst in the polymerization of propylene varies with the ratio of titanium dioxide to the triphosphoric acid employed in its preparation. This fact is indicated by the following tabulation in which the ratio of reagents used to prepare the catalysts is related to propylene polymerization activity expressed by the average propylene pressure drop per minute in the first two hours of the propylene polymerization reactions effected with the various catalysts.

Table 2

| $TiO_2$/commercial polyphosphoric acid[1] (by wt.) | Average Pressure Drop, lbs./min. in first 2 hours |
|---|---|
| 2 | 0 |
| 1 | 1.66 |
| 0.5 | 3.60 |
| 0.25 | 5.00 |

[1] Contains 47.8 w. percent $H_5P_3O_{10}$.

It is noteworthy that the Tifo catalysts produced by the use of 0.25 ratio in the above table was a hard, dry, solid material in spite of the large excess of phosphoric acid used in its preparation.

There is some evidence to indicate that a Tifo-type catalyst can be produced by the reaction of $TiO_2$ with a mixture of $P_2O_5$ and $H_3PO_4$, from which the inference may be drawn that there is in situ production of triphosphoric acid. Thus, a mixture was prepared of 20 g. of anhydrous $H_3PO_4$, 10 g. of $P_2O_5$ and 15 g. of $TiO_2$, which mixture was heated at 380° C. for 4 hours to produce a solid catalyst. The catalyst was tested for the polymerization of propylene employing 10 weight percent, based on the feed, at 200° C. in a stirred autoclave. The propylene pressure drop at the end of one hour was 125 lbs. At the end of 2 hours, 23 weight percent propylene conversion to polymers was obtained. The catalyst was dry and solid but not as hard as some of the Tifo catalysts derived from the reaction of $TiO_2$ with commercial polyphosphoric acid.

The Tifo catalysts prepared by the present process were tested in hydrodesulfurization reactions. A Tifo catalyst was prepared from titanium dioxide and a commercial polyphosphoric acid mixture (47.8 w. percent $H_5P_3O_{10}$) in the weight ratio of 0.5 and tested for vapor phase hydrodesulfurization of West Texas virgin naphtha containing 0.319 w. percent sulfur at 400° C., 1000 p. s. i. hydrogen pressure and liquid hourly space velocity of 2. In one run, 58.6% desulfurization and in a second, 67.5% desulfurization of the naphtha resulted.

The Tifo catalysts require no supporting material but can be composited, if desired, with porous or non-porous supports such as kieselguhr, alumina, titania, zirconia, chromia, charcoal, silica gel, silica beads, glass beads, or the like, and may be employed with conventional pelleting aids for the purpose of producing catalyst pellets in conventional machinery. The Tifo catalysts may contain various promoting metal oxides in proportions between about 0.5 and about 20 percent, based on the total weight of catalyst, for example oxides of metals selected from subgroups 5 and 6 of the periodic table, viz. oxides of V, Nb, Ta, Cr, Mo, W; group 2 metal oxides such as ZnO or MgO; group 8 metal oxides such as the oxides of iron, cobalt, nickel or platinum.

Although certain specific uses of Tifo catalysts have been described above, it should be noted that they are active catalyst for various conversions, particularly of hydrocarbons, which have heretofore been catalyzed by acidic catalysts (proton or Lewis acids) such as sulfuric acid, hydrofluoric acid, liquid or "dry" phosphoric acids, $AlCl_3$, acidic silica-alumina catalysts, active clays, and the like. Thus they may be employed for the cracking of heavy naphthas or gas oils at high temperatures, decolorization of petroleum fractions, removal of diolefinic components from cracked gasolines, polymerization of normally gaseous olefins, alkylation of aromatic hydrocarbons or heterocyclic compounds such as thiophene, furan and the like, isomerization of methyl paraffins such as 2-methylpentane, isomerization of xylenes and dehydrogenation reactions, for example dehydrogenation of cumene to produce alpha-methylstyrene.

The catalysts produced by the present invention may also be employed for the interaction of olefins with hydrogen sulfide to produce mercaptans; the isomerization of olefins, e. g. of 1-butene to 2-butene; the interaction of olefins, carbon monoxide and steam to produce carboxylic acids; the polymerization of olefin oxides; the interaction of alcohols or mercaptans with olefin oxides to produce polyalkoxy derivatives thereof; the dehydration of alcohols to produce olefins and ethers; the dehydration of 1,3-butylene glycol to produce butadiene; the reactions of olefins with carboxylic acids to form esters, etc.

When it becomes necessary to regenerate the Tifo catalyst by reason of the accumulation thereon of hydrogen-deficient carbonaceous materials or other catalysis-inhibiting materials, this may be accomplished by contacting the catalyst with oxygen-containing gases such as air or flue gases containing 1 to 10 volume percent oxygen at temperatures between about 400° C. and about 500° C. and atmospheric pressure for about ½ to about 10 hours. Alternatively, partially spent catalyst may be treated with hydrogen at temperatures between about 350° C. and about 500° C. under a hydrogen pressure of at least about 500 p. s. i., for example 500 to 2000 p. s. i., for about ½ to 24 hours. If desired, the oxidation and reduction treatments may be performed in succession. Also, as a preliminary to the above-mentioned regeneration treatments, it may be desirable to extract the catalyst with a hydrocarbon solvent such as benzene, pentane, hexane, or the like, at temperatures between about 50 and about 200° C. under pressure sufficient to maintain the extractant in the liquid phase, in order to remove extractable hydrocarbon residues from the Tifo catalyst.

Having thus described our invention, what we claim is:

1. A process for the preparation of a self-supporting solid material which is a catalyst for the polymerization of propylene, which process comprises heating reagents consisting essentially of titanium dioxide and triphosphoric acid in a weight ratio between about 0.1 and about 2 at a temperature between about 240° C. and about 600° C. in order to effect an exothermic, water-producing reaction.

2. The process of claim 1 which comprises initiating reaction at a temperature between about 240° C. and about 350° C. and thereafter heating the reaction mixture to a temperature of at least about 380° C., but not in excess of about 600° C., thereby producing a hard, solid catalytic material.

3. The process of claim 1 wherein the weight ratio of titanium dioxide to triphosphoric acid is between about 0.25 and about 1.3 and the reaction temperature is between about 240° C. and about 350° C.

4. The process of claim 1 wherein the weight ratio of titanium dioxide to triphosphoric acid is between about 0.25 and about 1.3.

5. The process of claim 1 wherein the triphosphoric acid is employed as a mixture with other phosphoric acids.

6. The process of claim 4 wherein said mixture contains about 50 weight percent of triphosphoric acid.

References Cited in the file of this patent

UNITED STATES PATENTS

| | | |
|---|---|---|
| 2,650,201 | Mavity | Aug. 25, 1953 |
| 2,656,323 | Bielawski et al. | Oct. 20, 1953 |

OTHER REFERENCES

Mellor's "Comprehensive Treatise of Inorganic Chemistry," vol. 8, 1928, page 945.